(12) United States Patent
Gopal et al.

(10) Patent No.: US 6,925,482 B2
(45) Date of Patent: Aug. 2, 2005

(54) ARCHIVAL DATABASE SYSTEM FOR HANDLING INFORMATION AND INFORMATION TRANSFERS IN A COMPUTER NETWORK

(75) Inventors: Ganesan Gopal, Alameda, CA (US); Kannan Ananthanarayanan, Fremont, CA (US); Tirumanjanam Rengarajan, San Jose, CA (US)

(73) Assignee: Slam Dunk Networks, Inc., San Mateo, CA (US)

( * ) Notice: Subject to any disclaimer, the term of this patent is extended or adjusted under 35 U.S.C. 154(b) by 753 days.

(21) Appl. No.: 09/740,718

(22) Filed: Dec. 18, 2000

(65) Prior Publication Data

US 2001/0032263 A1 Oct. 18, 2001

Related U.S. Application Data

(60) Provisional application No. 60/199,994, filed on Apr. 14, 2000, now abandoned.

(51) Int. Cl.[7] .............................................. G06F 15/16
(52) U.S. Cl. ..................... 709/201; 709/206; 707/104.1
(58) Field of Search ................................ 709/201, 206; 707/104.1; 705/40

(56) References Cited

U.S. PATENT DOCUMENTS 5,717,862 A * 2/1998 Annapareddy et al. ..... 709/237
6,122,632 A * 9/2000 Botts et al. ................... 707/10
6,163,809 A * 12/2000 Buckley ...................... 709/237
6,445,937 B1 * 9/2002 daSilva ........................ 455/574
6,587,549 B1 * 7/2003 Weik ........................ 379/93.24

* cited by examiner

*Primary Examiner*—Frantz B. Jean
(74) *Attorney, Agent, or Firm*—McDermott & Emery LLP (57) ABSTRACT

The present invention provides a system and method allowing businesses to send electronic messages, or other information, to conduct business over a digital network such as the Internet. Aspects of the system provide for a secure transfer of messages, tracking, monitoring, archiving, automated responses, statistics gathering and other features. The system provides a plurality of route point processors for routing messages independently of the Internet service providers (ISPs) routers and a unique forking algorithm whereby duplicate messages are generated and transmitted along separate communication backbones. Messages are archived at an intermediate point in the transmission path. The archival system and method provides a distributed archive that stores messages to guarantee message delivery to the destination, assists in message recovery and retains statistical information regarding the routing and delivery of the messages for subsequent access.

16 Claims, 6 Drawing Sheets

| Message Seq. No. 1  | Receipt Seq. No. 1  |
| Message Seq. No. 2  | Receipt Seq. No. 2  |
| Message Seq. No. 3  | Receipt Seq. No. 3  |
| Message Seq. No. 4  |                     |
| Message Seq. No. 5  | Receipt Seq. No. 5  |
| Message Seq. No. 6  | Receipt Seq. No. 6  |
| Message Seq. No. 7  | Receipt Seq. No. 7  |
| Message Seq. No. 8  |                     |
| Message Seq. No. 9  | Receipt Seq. No. 9  |
| Message Seq. No. 10 | Receipt Seq. No. 10 |
| Table 602           | Table 604           |

Fig. 6

ARCHIVAL DATABASE SYSTEM FOR HANDLING INFORMATION AND INFORMATION TRANSFERS IN A COMPUTER NETWORK

This application claims the benefit of Provisional Application No. 60/199,994 filed Apr. 14, 2000, now abandoned.

BACKGROUND OF THE INVENTION

This invention relates to the transfer of information over a distributed computer network. More particularly, this invention relates to a method and system for efficient and secure commercial communication over the Internet.

In the recent past, the electronic exchange of business information required businesses to establish proprietary electronic document interchanges (EDI) with their trading partners. EDI enables businesses to exchange information regarding common business transactions such as providing catalog information, requesting price quotations from its suppliers, issuing purchase orders and tracking delivery of ordered products. The information is contained in structured documents and is used in a wide range of industries to improve the efficiency of business operation.

Due to the extensive amount of information that must be exchanged, EDI requires reliable transmission infrastructure and robust computer networking capabilities to enable the exchange the information. For this reason it is common practice to establish dedicated high speed communication links, such as a leased T1 line, between each trading partner. While such links are reliable and secure, they are also expensive to establish and maintain. Thus, while every business needs to establish EDI relationships with each of its trading partners to improve efficiencies, many small businesses have been unable to do so because of the cost. Indeed, the expense of establishing a T1 line can often run several thousand dollars per month and may take many months to set up. However, many small businesses are unable to justify the expense of converting from exchanging paper documents using the mail or similar delivery systems. Many small-to-medium-size businesses are typically unable to afford the cost associated with participating in EDI simply because the volume of transactions they have with their trading partners are insufficient to justify the expense. In other instances, business do not use EDI because the prior art EDI systems do not readily scale to handle large numbers of participants without investing substantial sums of money to connect all of the business' trading partners. Accordingly, the use of EDI to exchange business documents have been limited to businesses that can justify the expense of maintaining a proprietary computer network between their offices and those of their trading partners. Clearly, what is needed is a reliable inexpensive system that enables a business to participate in EDI regardless of the volume of business it has with its trading partners.

Further, many businesses have invested substantial sums of money to configure and maintain application programs that enable business-to business electronic commerce. These application programs streamline operations relating to supply chain integration. Due to the inherent reliability of such networks, legacy business-to-business (B2B) application programs are rarely capable of efficiently dealing with delayed delivery or loss of data in transit. Thus, while the Internet holds promise to lower the cost to participate in EDI, businesses have also been reluctant to port B2B applications to distributed networks because of the lack of control over the data once it leaves a company's proprietary network. This concern arises because data transmitted over the Internet may be lost or delayed in transit for an extended period of time. For example, studies have shown that between four and six percent of the transmissions over the Internet are lost at some point along the Internet transmission path. Many more messages can be delayed for an extended period of time if the information is routed to a web server that is overloaded or that is not operating for a period of time. This inherent lack of reliability creates potential problems for both the data originator and the recipient.

By way of example, if a manufacturer uses an Internet-based EDI system to place an order with a supplier and the order document is lost during transmission over the Internet, the supplier will not send a confirmation of the order. However the manufacturer will be unable to determine if the message is lost or merely delayed. Thus, the manufacturer and the supplier must work to manually cancel the original order (because if it were to show up at the supplier at a later time it could be treated as another order) and then issue a duplicate order. Unfortunately, this type of problem is inherent in the distributed nature of the Internet itself. Accordingly, when businesses attempt to port these legacy B2B application programs to a distributed communication network such as the Internet, it is difficult to verify delivery of the information. This suggests that a mechanism is required to confirm both the transmission and the receipt of information transferred over the Internet. Unfortunately, many legacy B2B application programs designed for proprietary networks are not readily adaptable to respond to transmission-related delays or information loss. For this reason both the sender and the recipient need to be able to track the delivery and verify the content of the information.

Even if the legacy B2B application programs are adapted for use with a distributed network environment, they are not well adapted to scaling from hundreds of trading partners to thousands. It is not uncommon for a business to generate hundreds of thousands of transactions in a single day. Thus, the system adapted by the business must be capable of scaling to handle millions of transactions on a daily basis. Accordingly, notwithstanding the advantages associated with the prior art EDI systems, a method and system that adapts B2B applications for transmission of valuable business information over the Internet in a secure and reliable manner is needed.

SUMMARY OF THE INVENTION

The present invention provides a system and method allowing businesses to send electronic messages, or other information, to conduct business over a digital network such as the Internet. Aspects of the system provide for a secure transfer of messages, tracking, monitoring, archiving, automated responses, statistics gathering, and other features. Software components are used to handle details of the system including message process, message format, message syntax message semantics, message handling, message interaction and component message interfaces. The system provides for a plurality of route point processors for routing messages independently of the internet service provider (ISPs) routers.

The system uses a virtual private network to provide message delivery within predetermined amounts of time and can provide message latency that is improved over general Internet traffic. Customer-selected security levels can be specified for different types of traffic. Continuous and updated status of the system's network and customer messages is available via a website. Further, the present invention provides an efficient, low cost system for sending and receiving information over a distributed communication network that avoids the expense associated with proprietary electronic document interchange (EDI) networks. The novel system architecture readily adapts existing EDI networks and B2B application programs for use over the Internet.

The present invention employs a unique forking algorithm whereby duplicate messages are generated and transmitted along separate communication backbones. Using the separate backbones, the present invention is able to adapt to unexpectedly high traffic volumes on one of the communication backbones. As used herein, messages are formed by wrapping the information generated by B2B application programs in an extensible markup language (XML) wrapper that incorporates the XML protocol for routing and enhanced security. XML is a flexible syntax for describing messages so that trading partners may understand each other's data.

The present invention further employs a single point of control to ensure that information is not lost in transit and that it is delivered to the intended trading partner in a timely manner. Yet another unique feature of the present invention is the ability to deliver messages even if the recipient is temporarily off-line. Advantageously, the present invention eliminates the requirement for legacy EDI/B2B application programs to track and verify delivery of the information to the recipient. These features are enabled by archiving messages at an intermediate point in the transmission path using a unique archival system and method. More specifically, the archival system and method provides a distributed archive that stores messages to guarantee message delivery to the destination, assists in message recovery and retains statistical information regarding the routing and delivery of the messages for subsequent access. The combination of the wrapper and archives also provides the trading partners the ability to search, locate and otherwise mine data relating to messages exchanged over an extended time period.

DETAILED DESCRIPTION OF A PREFERRED EMBODIMENT

In the following description of a preferred embodiment, reference is made to the accompanying drawings, which form a part hereof, in which is shown by way of illustration specific embodiments in which the invention may be practiced. In the following description, numerous specific details are set forth in order to provide a complete understanding of the present invention. It will be apparent to one skilled in the art that the present invention may be practiced without the specific details. In the development of the actual implementation, numerous implementation-specific decisions must be made to achieve the design goals, which will vary for each implementation. Accordingly, in order not to obscure the present invention, well-known structures and techniques are not shown or discussed in detail.

The present invention relates to a message delivery system directed to the efficient, reliable and secure delivery of information across a distributed network such as the Internet. More particularly, the present invention relates to a message delivery system for electronic document interchange (EDI) adapted for use with a distributed communication system and a distributed archival database. In one particular embodiment, the database archives in a manner that enables recovery if the message is initially undeliverable, and provides statistical information regarding delivery as well. The archival database is geographically distributed with a fault tolerant architecture. Proactive monitoring and a fault-tolerant design insure that access to the archival database is always available.

Figure 1:
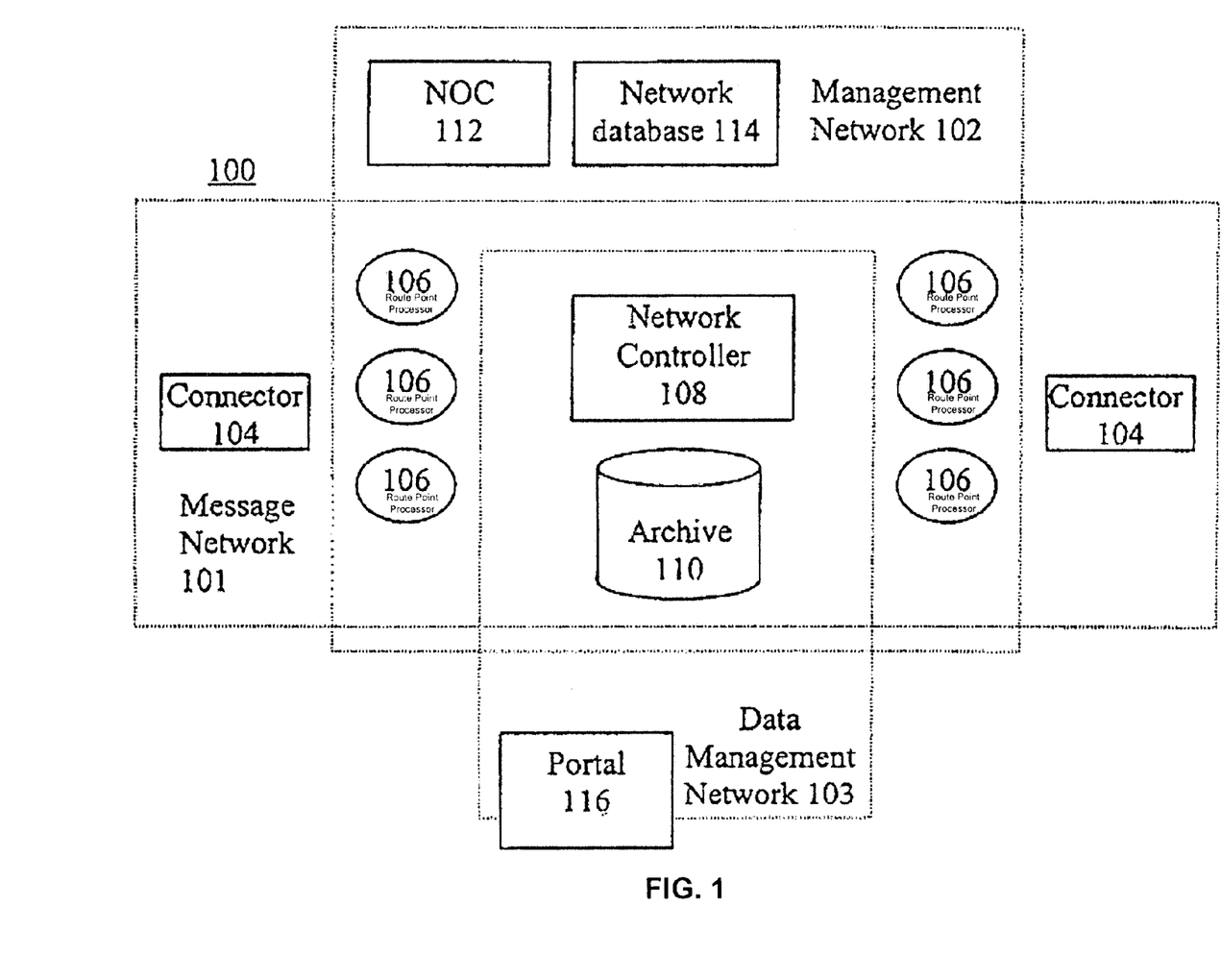
FIG. 1 illustrates the system hardware architecture and the interconnection of the main elements of the present invention.

Referring now to FIG. 1, the topology of one preferred embodiment of network 100 is shown. In this embodiment, the network is partitioned into three virtual networks referred to as message delivery network 101, management network 102, and data management network 103. The message delivery network employs connectors 104, route point processors 106, a network controller 108 and an archival database 110 to move messages from the source to the destination.

The management network 102, which monitors and manages operational features of network components, comprises a network operations center (NOC) 112 and a network database 114. The dotted lines in FIG. 1 are used to show the logical configuration of the networks and how various components are associated with different networks depending on the particular function being performed. The overlap of the networks is illustrated with reference to management network 102 where NOC 112 is dedicated to monitoring the physical status of the respective components and the communication backbone of message delivery network 101. When NOC 112 is notified of a problem, alert messages are transmitted to network managers or other personnel responsible for maintaining the network system. The alert message is transmitted either by e-mail, fax, telephone, pager, or other communication means such that appropriate personnel and repair equipment are timely dispatched to correct the problem. NOC 112 employs commercially available network management tools to remotely identify and correct the cause of the problem. Network controller 108 and NOC 112 utilize a shared network database 114 to exchange status information regarding the operational status of the network.

Data management network 103 provides a user having appropriate security access to query archival database 110 for data mining and monitoring performance parameters of message network 101. As with management network 102, data management network 103 encompasses portions of the message network 101 and more specifically, route point processors 106, network controller 108, and archival database 110. Data management network 103 further includes a portal 116. Portal 116 enables end users or application programs to access the data stored in archival database 110 to provide accounting, configuration, and performance information, as well as other value-added services that may be accessed through the API defined by portal 116. Access to the archive database is obtained through a data management network which defines a common API access through a portal. The portal access provides an opportunity for off-line analysis and enables the user to regenerate or to define alternative databases conveying various levels of information and functionality.

Message delivery network 101 includes a plurality of connectors 104 through which B2B/EDI application programs (referred to hereafter as B2B application programs) or users gain access to the message delivery network. Although only two connectors 104 are illustrated in FIG. 1, it should be apparent to one skilled in the art that the numbers of connectors is not limited because the connectors are software components that may populate any end user server or application server.

Message delivery network 101 further includes a plurality of route point processors 106 and network controller 108 responsible for managing connections between connectors and route point processors. Each connector 104 provides the necessary interface between message delivery network 101 and the respective source and destination application or user. More specifically, connectors are the main workhorses of message delivery network 101. Each connector is responsible for encryption, compression, XML packaging, address resolution, duplicate message filtering, error recovery operations and passing messages upon receipt to the appropriate B2B application program or user.

Connectors 104 may include an adaptor module that provides an application program interface (API) that plugs into a third-party B2B application program. This adaptor may be a Java object specifically programmed to handle the transfer of data to and from an application and to establish a connection through any intervening firewall. The integration of the connector with an application or a specific API is considered implementation-specific and is not further discussed herein. The primary function of adaptor is to handle the translation of information between an application generator and standard HTTP protocol. The adaptor does not require any knowledge of the content of the payload other than the delivery address and delivery priority so the payload information may be encrypted for security.

Each connector 104 comprises a software module, referred to as a routing processor, which contains the logic necessary to interface to message network 101. The primary responsibility of a routing processor is to establish connection with selected route point processors 106 in accordance with network configuration data obtained from network controller 108. The routing processor connector functions as an HTTP proxy interface for the application generator establishing contact with specified route point processors 106. In one preferred embodiment, the routing processor is a Java object having the function that enables communication between the connector and the network controller 108.

In operation, the routing processor establishes a connection with at least two route point processors 106 using communication backbones specified by network controller 108. The routing processor then prepares two messages for transmission. One message is designated as the primary message. The other message is designated as the secondary message. Both messages are identical, except, however, each message will be sent along a different communication backbone to separate route point processors. In this manner, if one transmission network is slow due to a high volume of traffic or is experiencing transmission delays or disconnection problems, the other message will be routed along a different communication backbone not experiencing such problems.

The primary task of network controller 108 is to load-balance message traffic over the message delivery network 101 so that connectors are not assigned to route point processors experiencing high traffic volume. Load balancing seeks to minimize transit time for each message by identifying system bottlenecks and re-configuring network topology when necessary. Delivery latency is minimized when communication backbone has sufficient transmission bandwidth to handle the message volume. In comparison, transmission over the Internet is blind in that messages could get routed to an Internet service provider (ISP) that is overwhelmed and unable to promptly forward messages. When updating routing configuration, network controller 108 pushes information directly to the selected route point processor. Any information sent by network controller 108 to a connector is routed through a route point processor and passed on to the connecter once a socket connection is established.

Both connectors and route point processors can access network controller 108 and pull, by way of example, information necessary to recover undelivered messages, track delivery status of messages, determine average transmission latency or determine the content of a previously delivered message. Network controller 108 maintains network database 114 which includes information relating to the real-time status and operation of network 100. It will be appreciated that when a problem is identified by NOC 112, a status update is reflected in database 114. In response to status updates, network controller 108 may reconfigure the network configuration to minimize the impact of the problem on the operation of the network.

Route point processors 106 are Internet-based message engines capable of accepting multiple connections and handling multiple threads. Route point processors 106 act as a route point between connectors 104. Route point processors allow messages to be delivered to the selected destination along segments of a communication backbone selected by the network controller 108. In order to deliver messages, route point processors 106 retain messages until the specified connector establishes a socket connection, which is a virtual connection between processes using Unix's standard I/O over a network communication backbone. Using this connection, the route point processor delivers inbound messages to the connector.

Message network 101 further includes a redundant, fault-tolerant distributed archival database 110 that serves as a message repository. Physical components of archival database 110 such as disk drives and controllers are geographically distributed throughout the message network 101 and are coupled to the communication backbone through route point processors 106. In one preferred embodiment, archival database 110 comprises sets of independent databases that are partitioned and dedicated on a "per connector" basis. Archival database 110 is a write-mostly database, but is accessed in conjunction with message recovery algorithms initiated by a destination connector, reporting and data mining operations.

Since route point processors 106 retain messages until the destination connector establishes the socket connection, the present invention uses the route point processor 106 as archive points for messages transmitted between connectors. Specifically, when a message arrives at a route point processor 106, it is duplicated with the duplicate message redirected to archival database 110. This duplication and redirection process is performed transparently to either the source or the destination connector. With the archival copy, delivery of the message to the destination connector becomes the responsibility of the route point processor even if the destination connector is down or is otherwise not accepting messages. The combination of the route point processor and archival database 110 enables transport level acknowledgments to be used as the protocol between a source connector and the route point processor to establish proof of delivery.

Figure 2:
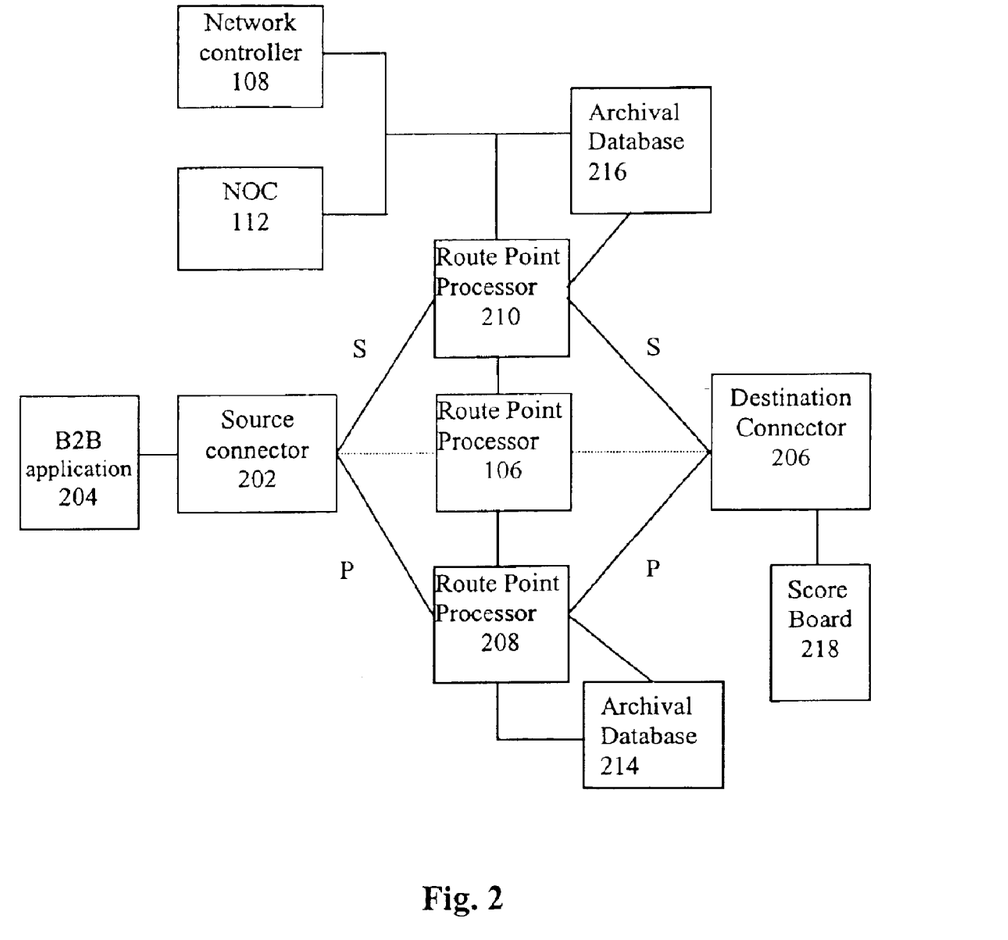
FIG. 2 is a simplified illustration of the interconnection of the elements of the present invention.

The operation of network 100 is described in conjunction with FIG. 2, which illustrates network 100 in the context of two trading partners. Source connector 202 is responsible for generating and delivering messages to the communication backbone. More specifically, once source connector 202 has generated the message, it establishes transmission paths along two separate communication backbones to primary and secondary route point processors. By way of example, source connector 202 establishes a first transmission path with route point processor 208 and a second transmission path to route point processor 210. Then, source connector 202 transmits the message twice using the two separate, independent backbones. In this manner, each of the route point processors 208 and 210 receives the message. It will be appreciated that the present invention may be readily adapted so that more than two messages are transmitted if dictated by the specific requirements of a particular application. Source connector 202 retains a copy of the message until an acknowledgment of message receipt at the respective route point processors is received.

Each route point processor archives the message in an archival database associated with the source connector upon receipt. Since there are two messages in transit, two separate archived copies of the message will be retained. As a practical matter, one of the messages sent from the source connector to one of the route point processors will be designated as the primary message. This message will be stored in an archival database that is designated as the primary archival database 214. The second message sent from the source connector to the other route point processor will be referred to as the secondary message. It is transmitted along a different communication backbone to a secondary route point processor where it is archived in a secondary archival database 216. It should be understood that the primary and secondary designations are arbitrary and assigned merely for convenience. In the event that one of the transmission paths, route point processors and/or archives fails due to a physical or logical problem, any message may be readily acquired from the other archive along the other transmission path. The duplicate transmission of messages from the source connector and the duplicate archiving of messages provides a redundant fault-tolerant system that ensures the delivery of the message to the destination even if there is a failure or delay in the delivery process. For this reason, once the message is archived, each route point processor transmits an acknowledgment to the source connector and assumes responsibility for delivery of the message. The source connector is then free to engage in other tasks.

Each route point processor attempts to transmit the message to destination connector 206, if possible. If the destination connector is not active, messages are retained in the archive until such time as the destination connector is again available. Upon receipt of the primary message at destination connector 206, a confirmation acknowledgment is sent to the primary route point processor. Another confirmation is sent to the secondary connector upon receipt of the secondary message. Each route point processor then writes the receipt confirmation to the respective archival database with additional delivery-related information indicating the time and date of the delivery. Further, each route point processor periodically transfers a summary record to network controller 108 specifying the number of messages received from the source connector and delivered to the destination connector.

At the destination, destination connector 206 checks scoreboard 216 to determine whether the message sequence number associated with the message has been previously recorded. If the message has not been received, the destination connector updates scoreboard 216 to indicate receipt of that specific message, and the XML wrapper activates the appropriate B2B application program and the opaque information is provided thereto. If one of the messages has already been received, destination connector 206 will not transmit the subsequently received (that is the second to arrive) message to the B2B application program or the user associated with the destination connector.

If destination connector 206 is nonresponding and neither route point processor can complete transmission, an error condition is encountered. Each route point processor maintains the message in the archival database until the destination connector is available. Further, both the primary and secondary route point processors will notify the network controller 108 indicating that a transmission path to the destination connector 206 cannot be established. When destination connector 206 is again operational, it registers with network controller 108 during the re-boot/registration process. As part of the registration process associated with re-booting, destination connector 206 will obtain information from network controller 108 regarding any messages that may have been missed during the nonoperational time period. Network controller 108 transmits information regarding the source of the message, the time it was sent, and a sequential message number. This information is received by destination connector 206 and stored in the associated scoreboard 216. Subsequently, destination connector 206 establishes a connection with any available route point processor in the network system, for example, route point processor 106. Destination connector 206 then uses information obtained from the network controller to request specific messages from the archival databases.

The route point processor receiving the destination connector's request establishes a connection to either the indicated primary or the secondary archival database to recover the message. Once the message is recovered from the archival database, the route point processor transmits the message to the destination connector. Upon receipt of the recovered message, an acknowledgment is sent from destination connector 206 to the route point processor indicating receipt of the information. For message tracking purposes, the acknowledgment provides the time and date that the message was delivered by the primary and secondary archival databases. Route point processor 106 is responsible for updating both archival databases. After sending the acknowledgment indicating receipt of the message, destination connector 206 then verifies that the message has not previously been received by comparing the sequential message number to previously received message numbers.

With the distributed database archive of the present invention, messages sent between trading partners are archived in a manner that guarantees one hundred percent transmission of messages or, alternatively, prompt notification of the failure to deliver the message. Accordingly, the present invention avoids the problem associated with messages being lost or dropped when transmitted across the Internet. By eliminating the problems associated with interfacing legacy B2B application programs with public networks such as the Internet, the present invention provides the layer of logic and system components that adapts virtual private networks (VPNs) for use in EDI applications used by large numbers of trading partners. As is well understood in the art, VPNs may include the use of encryption in the lower protocol layers to provide a secure connection through an otherwise insecure network such as the Internet. VPNs are generally cheaper than real private networks using private lines but rely on having the same encryption system at both ends, a task well suited to being included in the connectors. This layer of encryption provides extra protection by encrypting the messages to prevent a listener from improperly obtaining information. Further, the present invention scales to an unlimited number of trading partners.

Referring again to FIG. 1, archival database 110 is central to providing many of the advantages associated with the present invention. In one preferred embodiment, archival database 110 is capable of storing approximately one million messages per day per trading partner. Advantageously, archival database 110 is scalable to meet the actual number of messages between a business and its trading partners so if the message volume increases, additional hardware components may be added to the network and the archival database seamlessly expanded.

Figure 3:
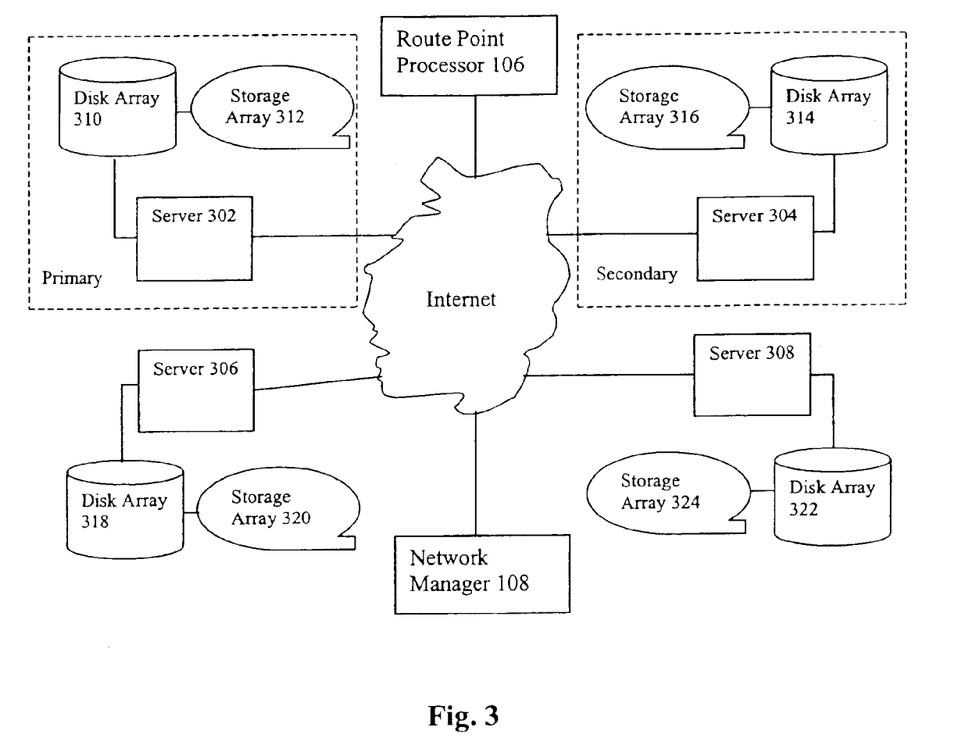
FIG. 3 is another simplified illustration of the interconnection of the elements of the archival database of the present invention.

A portion of archival database 110 is illustrated in FIG. 3 as comprising web servers 302, 304, 306, and 308, each having a plurality of disk drives and back up storage devices such as tape drives or optical disk drives. As illustrated, web server 302 has disk drives 310 and backup devices 312 while web server 304 has disk drives 314 and backup devices 316. It will be understood that archival database 110 includes a plurality of web servers geographically distributed throughout the world to ensure that access to the archival database is not precluded by a local disaster or hardware failure. By way of example, if the primary archival database is located in San Jose, Calif., the secondary archival database for one specific connector would be located in a different city such as Nashville, Tenn. or Paris, France. Regardless of location, web servers 302–308 are coupled to the network controller and route point processors by a communication network, such as a lease line or the Internet. The use of two companion archival databases dedicated to each connector guarantees timely delivery even if the destination connector is not available at the time the messages are delivered to the route point processor or even if one of the web server is being upgraded or is experiencing a hardware failure.

Network controller 108 is responsible for designating the web servers assigned to each connector. For example, if one user expects to send 100,000 messages per day, the network controller will designate two available web servers by sending the connector the IP address of each web server as well as the listening port. This IP address and port information is included in the header of the message by the connector. When additional users sign on to use the system, network controller 108 acquires an estimate of the number of messages expected from each user. As a practical matter, contractual agreements generally are used to specify the maximum number of messages the user is authorized to send during a calendar day and this information is generally made available as part of the client profile retained in the network database. This maximum number of messages is used to allocate sufficient space in the archival database. Thus, if the second and third users are each entitled to send 500,000, one of the users will be assigned to the archives associated with web servers 302 and 304 while the second user will be assigned to web servers 306 and 308. It is to be understood that the assignment is based on criteria employed by the network controller 108. It is to be understood that the criteria used by network controller 108 is an engineering decision and the manner in which it assigns web servers to a particular connection is not important but rather that the assignments be updateable in real time. Network manager 108 may change the assignment at any time as dictated by high traffic, excessive latency, component failure or other factors as determined on a case by case basis.

Each web server 302–308 includes a computer server capable of handling multiple threads simultaneously and program logic executed by the computer server for performing the archive functions. Web servers archive messages in a relational database upon receipt from the route point connector. In one preferred embodiment, the database engine is the relational database management system Oracle 8i, available from Oracle Corporation of Redwood City, Calif.

Figure 4:
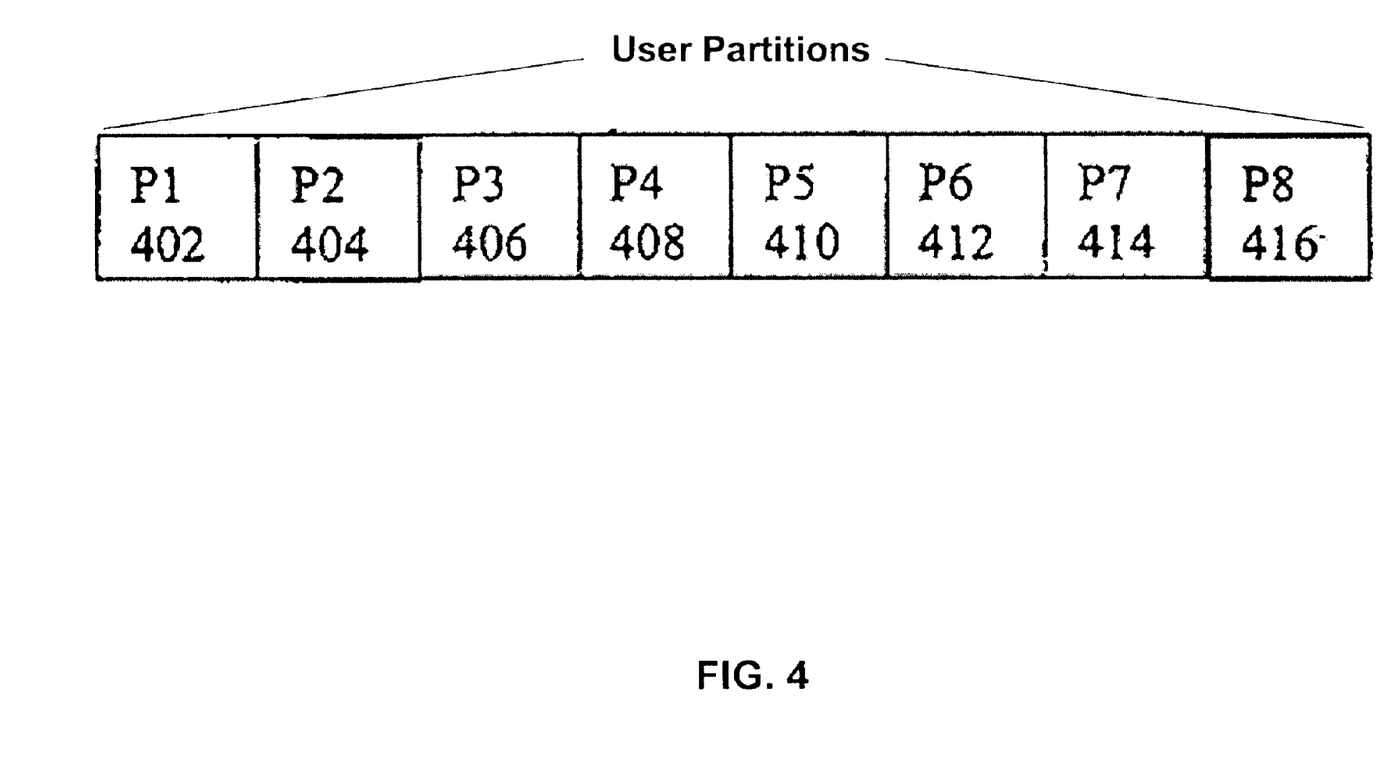
FIG. 4 illustrates partitioning of a user's partition in the archival database in accordance with the present invention.

The disk drives are logically partitioned for each user. Thus, since each archival database can store up to a million messages on a daily basis, a first user that has contracted to send 100,000 messages per day would have a partition capable of storing up to 100,000 messages. If the user were to increase the number of daily messages, the partition size could be correspondingly increased. Within each user partition, additional logical partitions segregate messages sent on a daily basis. In one preferred embodiment, each user partition is further partitioned into eight (8) additional partitions 402–416 as shown in FIG. 4. When the user first sends messages, messages and delivery receipts received from the destination connector are stored in partition 402. Messages and delivery receipts received on the next subsequent period are stored in the second partition 404 and so on until seven partitions have been filled. In the preferred embodiment, each period is a calendar day. During the eighth period (which, in the preferred embodiment, is the start of the next cycle), messages and receipts are stored in the eighth partition 416 and the contents of partitions 402–414 are moved to off-line storage. The partitions minimize the number of times an archive database needs to be moved to back up storage devices. Since these partitions form a circular buffer, the second period of the second cycle will be stored in partition 402 and so on.

The program logic on the web server performs the critical task of matching delivery receipts from the destination connector with the messages. This matching process is illustrated with reference to FIGS. 5 and 6. In typical operation, a message is received at the archival database from the source connector as indicated at step 502. At step 504, receipts are received from the destination connector. The program logic matches the receipt with the message and notifies the network controller that the message has been delivered. Since the business model associated with the present invention contemplates that users are billed only upon receipt, notification is critical to the billing process. In one preferred embodiment, the web server pushes the message header information to a database associated with the network controller as indicated at step 506. More specifically, a billing database is associated with network controller 108 that retains a sequentially ordered list of messages sent through the source connector to each of its trading partners. This database contains at least three months of billing information, that is, the message sequence number or other identifying information and the receipt information. At the end of each day, the tracking information is pushed from each of the archival databases to the billing database.

Figure 6:
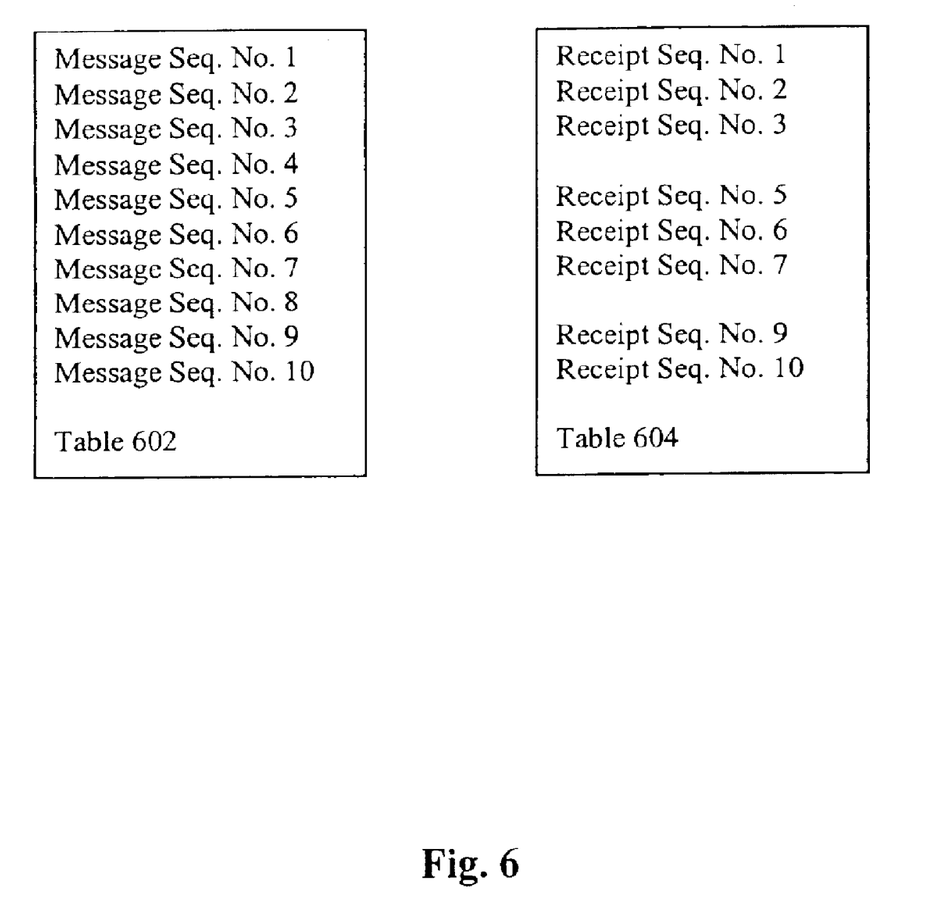
FIG. 6 illustrates tables used in tracking receipt of messages in accordance of the present invention.

When messages are not deliverable immediately upon receipt at the route point processor and, when the current partition closes, no additional writes to the partition are allowed. Thus, if a message was received at time 23:59:59, the receipt will likely be recorded in the next subsequent partition. This means that an undelivered message remains in the previous partition. Similar problems arise if a message is undeliverable for a period of time in that the receipt and the message will reside in different partitions. To track delivery of messages over time, program logic maintains a first table 602 listing the sequence number of messages received and a second table 604 listing receipts received such as is illustrated in FIG. 6. Table 602 maintains the message sequence numbers, sequentially, in an ordered flat file. When a receipt is received, it is matched to the corresponding message sequence number and the message's header information is pushed to the network controller. When either the primary or the secondary message is received at the destination, a receipt is sent to both the primary and the secondary route point processor. Thus, it is possible that a receipt will arrive prior to the arrival of the corresponding message at the archive. This situation could occur if a communication backbone were to experience high traffic volume or if there were a hardware failure at the route point connector. Accordingly, table 602 will also maintain a list of received receipts that are not matched with a corresponding message.

A similar problem arises when an archival database does not receive a message from its route point processor. Accordingly, the archival databases need to be resynchronized from time to time. When NOC 112 identifies a problem with a route point processor, the web server is notified. The web server then establishes a communication link with the companion database and transfers any missing messages. The processing logic executed by each web server includes a Java servlet to provide this function.

Referring again to FIG. 5, when a receipt for a message is not present in table 604, the network controller 108 is notified. Subsequently, when the destination connector is again receiving messages, the network controller will advise it of any missed messages as indicated at step 508. Network controller 108 determines which messages have not yet been delivered querying tables 602 and 604 to determine if a message has been received (table 602) but not yet matched with a receipt (table 604). Conceptually, table 604 filters the contents of table 602 allowing only those message sequence numbers that correspond to unsent messages to pass to the destination connector.

Figure 5:
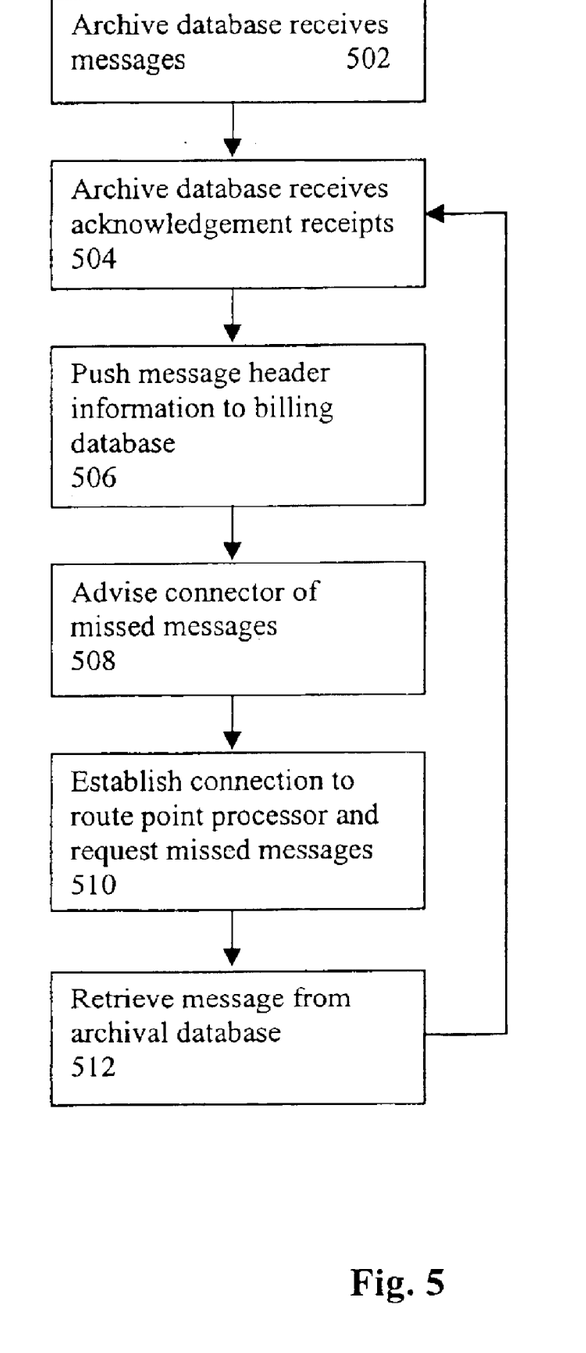
FIG. 5 is a flow diagram illustrating processing logic of the present invention.

Upon receipt of the list of missed messages, the destination connector issues a request to a route point processor for missed messages as indicated at step 510. Using the sequence number, the program logic at the route point server locates the web server, designates the archival database in which the message is stored and requests that the message be sent to the destination as indicated at step 512. When the delivery receipt is received, the receipt is combined with the message header and the network manager is notified as indicated at step 514.

On a weekly basis, the user's partitions are moved to an off-line storage device such as a tape drive. In the event that a particular message has not yet been sent, it is treated as a special case. Specifically, program logic searches for all undelivered messages and creates a copy of each one in a reserved area, as indicated at step 516. When the seven partitions are moved to the backup storage medium, the copy in the reserved area can be accessed in the event the destination controller were to request missed messages. However, the message could, of course, always be recovered from the off-line storage device.

Figure 7:
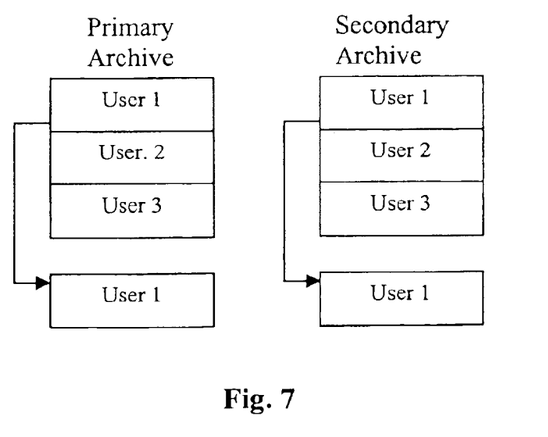
FIG. 7 illustrates partitioning of the archival database of the present invention.

Referring now to FIG. 7, the partitioned architecture of the present invention provides additional advantages not present with prior art EDI systems. Specifically, each user partition may be expanded to meet message traffic increases without disturbing the archival databases associated with other users. When several users, by way of example user 1, user 2 and user 3, share primary and secondary archival databases that are operating at maximum capacity, none of the users can expand unless space is taken from other users and assigned to the user requiring added space. Instead, when message volume expands, the present invention assigns the user with the increased message volume to another archival database without disturbing the shared archive. When a message is received from the high volume user, the route point processor uses a round robin strategy to populate the archives. Advantageously, additional archives are readily added to the network system assigned to a particular source connector. Network controller 108 monitors archive usage and assignment to maximize efficiency. This scheme minimizes the overhead associated with recovering messages from the archives because, while a user is assigned to specific archives, the network controller need only search a limited number of the web servers populating the system when attempting to locate a message. Further, since there is no need to move the low volume user to another archive, system bandwidth is not utilized reorganizing the various archives when one user increases its daily message volume.

Another advantage of the present invention is the ability to data-mine the archive. For example, the user at the source can determine the most efficient communication backbone, the transmission latency, and the number of messages sent to each of its trading partners by querying the billing database. Yet another advantage provided by the archives arises from the authenticating nature of the archive. Specifically, the archive is maintained off-site from any user by a third party entity separate from either the sender or the recipient. In the event of a dispute where one party denies that the message was delivered, the archives may be queried to determine the time and date of delivery, the route the message took to reach the destination and the content of the message. Alternatively, the archive can be accessed to acquire the message either from one of the partitions or from the backup storage device. Since security is of concern, access to the archive is typically limited to the user associated with the source. Thus, the recipient will not be able to access any message other than those messages directed to the recipient.

Yet another advantage of the partitioned archive is that different versions of the program logic may be executed at each web server. Further, the program logic at each web server may be upgraded independently since there is no requirement that the companion archives associated with a user be running the same version of the programming logic. Further still, during the time that an archive is off-line and new software is being installed, the network controller 108 or another partition may be used as a temporary archive caching messages until the upgrade is complete. When an upgrade is complete, the archive is re-synced with the missed messages archived by network controller. Accordingly, there is no limitation as to when an upgrade may occur.

One skilled in the art will readily appreciate that archives may be implemented using a variety of technology components and software. One preferred embodiment of the present invention uses a shared disk architecture so that multiple web servers may access the archive. Although each web server has access to the archive database, only one server may access the database at a time. At any one site, the web servers monitor the activity of the other servers, so even if one server suffers a failure the archive may still be accessed by an alternative server.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

What is claimed is:

1. In a networked computer system having a plurality of connectors associated with application programs for the electronic interchange of documents and a plurality of route point processors coupled together on a communication network, a process for sending messages from one connector to another in said networked computer system, said process comprising the steps of:

providing a first and second communication network;

providing a first route point processor coupled to one of said connectors by said first communication network; said one of said connectors having a message to be sent to a destination connector; said destination connector coupled to said first route point processor by said first communication network;

providing a second route point processor coupled to said one of said connectors by said second communication network; said destination connector coupled to said second route point processor by said second communication network;

transmitting said message from said one of said connectors to said first route point processor;

transmitting said message from said one of said connectors to said second route point processor;

archiving said message at said first and second route point processors;

directing said one of said connectors to discontinue monitoring delivery status of said message upon archiving of said message at said first and second route point processors;

transmitting said message from said first route point processor to said destination connector;

transmitting said message from said second route point processor to said destination connector;

directing said first and second route point processors to monitor the delivery status of said message; and selectively processing either the message received from said first route point processor or said second route point processor.

2. The process as claimed in claim 1 wherein said archiving step further includes the step of configuring a first and second archival database associated with said one of said connectors, said step of configuring further includes the step of associating said first archival database with said first route point processor and associating said second archival database with said second route point processor.

3. The process as claimed in claim 2 further comprising the steps of transmitting an acknowledgment receipt upon archival of said message by said first route point processor; and transmitting an acknowledgment receipt upon archival of said message by said second route point processor.

4. The process as claimed in claim 3 wherein said step of configuring further includes a step of providing a network manager for configuring said first and second archival databases.

5. The process as claimed in claim 4 further comprising the step of transmitting an acknowledgment receipt from said destination connector to said first and second archival databases via said first and second route point processors.

6. The process as claimed in claim 5 wherein said step of transmitting an acknowledgment includes the step of matching said acknowledgment receipt with said message in said first archival database.

7. The process as claimed in claim 5 wherein said step of transmitting an acknowledgment includes the step of matching said acknowledgment receipt with said message in said second archival database.

8. The process as claimed in claim 5 further comprising the step of providing a billing database associated with said network manager; said billing database adapted for maintaining a list of delivered messages.

9. The process as claimed in claim 8 wherein said step of providing a billing database further includes the step of maintaining statistical information regarding delivery of said message.

10. In a networked computer system having a source connector adapted for generating messages and at least two route point processors coupled to said source connector by a first and second respective communication backbone; said route point processors further coupled to a destination connector by said respective communication backbones, a process for transmitting messages from said source connector to said destination connector comprising the steps of:

transmitting said message from said one of said connectors to said first route point processor;

transmitting said message from said one of said connectors to said second route point processor;

configuring a first and second archival database associated with said source connector; said step of configuring further includes the step of associating said first archival database with said first route point processor and associating said second archival database with said second route point processor;

archiving said message in said first archival database upon receipt by said first route point processor;

archiving said message in said second archival database upon receipt by said second route point processor;

directing said source connector to discontinue monitoring delivery status of said message once said message has been archived in either said first or second archival database;

transmitting said message from said first route ,point processor to said destination connector;

transmitting said message from said second route point processor to said destination connector;

directing said first and second route point processors to monitor the delivery status of said message; and selectively processing either the message received from said first route point processor or said second route point processor.

11. The process as claimed in claim 10 further comprising the steps of transmitting an acknowledgment receipt to said source connector upon archival of said message by said first route point processor; and transmitting an acknowledgment receipt to said source connector upon archival of said message by said second route point processor.

12. The process as claimed in claim 10 wherein said step of configuring further includes a step of providing a network manager for configuring said first and second archival databases.

13. The process as claimed in claim 12 further comprising the step of transmitting an acknowledgment receipt from said destination connector to said first and second archival databases.

14. The process as claimed in claim 13 wherein said archiving step includes the step of matching said acknowl edgment receipt with said message in said first archival database.

15. The process as claimed in claim 14 further comprising the step of providing a billing database associated with said network manager; said billing database adapted for maintaining a list of delivered messages.

16. The process as claimed in claim 15 wherein said step of providing a billing database further includes the step of maintaining statistical information regarding delivery of said message.

* * * * *